United States Patent [19]

Krummheuer et al.

[11] Patent Number: 5,657,798
[45] Date of Patent: Aug. 19, 1997

[54] INTERMINGLED SYNTHETIC FILAMENT YARN FOR MANUFACTURING INDUSTRIAL WOVEN FABRICS

[75] Inventors: Wolf Rudiger Krummheuer, Wuppertal; Volker Siejak, Duisburg; Hans Albert Graefe, Schwelm; Marcus Weber, Erlenbach, all of Germany

[73] Assignee: Akzo Nobel NV, Arnhem, Netherlands

[21] Appl. No.: 635,836

[22] Filed: Apr. 22, 1996

[30] Foreign Application Priority Data

Apr. 22, 1995 [DE] Germany .................. 195 14 898.3

[51] Int. Cl.$^6$ .................................................. D03D 15/00
[52] U.S. Cl. ............... 139/420 A; 139/384 R; 139/387 R; 139/389; 139/420 R; 280/728.1; 428/36.1; 428/357; 428/364; 428/365; 428/401; 442/181
[58] Field of Search ................ 428/36.1, 225, 428/229, 357, 364, 365, 401; 139/384 R, 387 R, 389, 420 A, 420 R; 280/728.1

[56] References Cited

U.S. PATENT DOCUMENTS

| | | | |
|---|---|---|---|
| 5,236,775 | 8/1993 | Swoboda et al. | 428/225 |
| 5,421,377 | 6/1995 | Bonigk | 139/426 |
| 5,508,073 | 4/1996 | Krummheuer et al. | 428/35.1 |
| 5,518,814 | 5/1996 | Bonigk | 428/365 |

FOREIGN PATENT DOCUMENTS

| | | |
|---|---|---|
| 974 745 | 9/1975 | Canada . |
| 0 607 798 A1 | 7/1994 | European Pat. Off. . |
| 4 209 846 | 7/1992 | Japan . |
| 641 844 | 2/1994 | Japan . |
| 6 306 728 | 11/1994 | Japan . |

OTHER PUBLICATIONS

Derwent Abstract Appln. No. 93–162380, published Apr. 16, 1993.
Patent Abstract of Japan Appln. No. JP910092365, published Nov. 13, 1992.

*Primary Examiner*—James J. Bell
*Attorney, Agent, or Firm*—Joseph M. Noto; Louis A. Morris

[57] ABSTRACT

For producing woven fabrics for air bags and other industrial applications, an intermingled unsized synthetic filament yarn is used with a yarn titer of 100–1000 dtex. The individual filaments of the yarn have a titer not exceeding 5 dtex. The yarn exhibits a mean opening length of 2–10 cm, the coefficient K1 for the stability of the intermingling points of the yarn exceeds 0.6, and the coefficient K2 for the stability of the intermingling points of the yarn exceeds 0.3. This yarn can be used to manufacture industrial woven fabrics with the required properties, in particular woven fabrics for air bags, in a cost-effective manner.

6 Claims, No Drawings

INTERMINGLED SYNTHETIC FILAMENT YARN FOR MANUFACTURING INDUSTRIAL WOVEN FABRICS

CROSS REFERENCE TO RELATED APPLICATIONS

This application claims the benefit of the filing date of prior German Application No. P195 14 898.3 filed Apr. 22, 1995, which is incorporated herein by reference in its entirety.

BACKGROUND OF THE INVENTION

1. Field of the Invention

The invention relates to an intermingled unsized synthetic filament yarn, in particular a synthetic filament yarn for manufacturing woven fabrics for air bags or other industrial applications, with a yarn titer of from 100 to 1000 dtex.

2. Description of the Related Art

Woven fabrics for manufacturing air bags must fulfill a number of very different requirements. In addition to the especially important specifically adjusted air permeability, these fabrics must have good aging resistance, high strength, good foldability, and a high degree of flexibility when the air bag is triggered as the result of a collision. Corresponding to the particular demands placed on the properties of the fabric, there are also very specific requirements for the yarns to be used. These requirements relate on the one hand to their effect on the properties of the fabric and on the other hand to their workability during fabric manufacture.

In practice, it has been difficult to meet all requirements in the manner desired by automobile manufacturers in particular.

The first air bags were made preferably from coated woven fabrics. These have not proven particularly satisfactory, not only because of their manufacturing costs but also due to several disadvantages during use.

After the increased appearance of uncoated air bag woven fabrics, the yarns initially employed had for the most part relatively high yarn and filament titers. While in most cases this permitted attainment of the required air permeability and strength, these fabrics were frequently unsatisfactory with respect to foldability and flexibility.

For woven fabric manufacture, the yarns cited were almost always sized when used for the warp, less frequently twisted. The weft often comprised unsized and untwisted yarns, although twisted yarns were also employed in the weft.

Both twisting and sizing considerably increase the manufacturing costs for the yarns and thus for the woven fabrics. In addition, the size must be removed after fabric manufacture, i.e., the fabric must be desized. This process poses problems from economical and ecological standpoints, since not only are costs involved for the desizing but additional costs are also incurred for the processing of the desizing baths that is mandated by ecological considerations.

Although the desizing costs do not apply in twisting, which involves roughly the same level of costs as sizing, there is another disadvantage in this case, since experience has shown that twisted yarns produce fabric with a more "granular" surface than untwisted yarns. Furthermore, when using twisted yarns, it is more difficult to establish a specific value of air permeability.

An improvement in foldability and flexibility can be attained if yarns are used with a relatively low titer for the individual filaments. Such yarns have already been proposed for making air bags.

In EP-A 442 373, a polyester filament yarn with a yarn titer of 250–550 dtex and a filament titer <4 dtex is described for making uncoated air bag woven fabrics. The yarns, at least in the warp, are to have a twist of 110–130 T/m. The aforementioned disadvantage of using twisted yarns applies in this case.

In JP-A 04-209 846, the use of filament yarns with a yarn titer of 210–750 den (235–840 dtex) and a filament titer <5 den (5.5 dtex) is recommended for air bag woven fabrics. The yarns can be untwisted, but a twisted yarn for the warp with a twist of <200 T/m is proposed. In using twisted yarns, the aforementioned disadvantages arise; if untwisted yarn is employed in the warp, it would be nearly impossible to process it satisfactorily on the loom at a high fabric density without size.

The use of extremely fine individual filaments with a titer <2 den (2.2 dtex) is described in JP-A 05-093 340 for air bag filter fabrics. In this case, it cannot be determined whether these yarns are to be unsized, something which would be nearly impossible in practice.

Polyamide yarns with filament titers of 1–6 den (1.1–6.7 dtex) and yarn titers of 70–840 den (80–940 dtex) are proposed in JP-A 06-041 844. It is not stated whether the yarns used are to be sized or unsized.

As is known in the weaving industry, processing of fine-filament yarns, especially warp yarns, is considerably more difficult than weaving coarse-filament yarns, since with fine-filament yarns there is a significantly greater risk of filament breaks and thus of so-called fluffs, which lead to stoppage of the loom as well as flaws in the fabric. For this reason, it has up to now been important to provide fine-filament yarns with a sufficiently large amount of size in order to ensure problem-free processing on the loom.

In the chemical fiber processing art, it is known that intermingling of the individual filaments can serve as an alternative to sizing.

The processing of intermingled yarns into woven fabrics for air bags is known. It is described in CA-A 974 745. As is demonstrated by the embodiment example of this document, the recommendation to use intermingled yarns applies to yarns with a high filament titer (6.7 dtex). Moreover, no statements are made concerning the degree of intermingling the yarns are to exhibit and what stability the intermingling points must have.

In JP-A 06-306 728, an air bag woven fabric is described that is made from intermingled multifilament yarns with a filament titer less than 3.3 dtex. The degree of intermingling of the yarns is to be at least 20 per m, i.e., the mean opening length is less than 5 cm. This document provides no teaching concerning what stability the intermingling points must have in order to ensure problem-free processing in the weaving mill.

Also, the use of intermingled yarns has often been described for making woven fabrics in the clothing industry. An example is DE-A 4 327 371, in which especially the processing of intermingled yarns with low opening tendency of the intermingling points of the yarns, with appropriate tension on the loom, is described.

Consequently, the prior art does not teach what steps must be taken to provide fine-filament yarns that can be processed satisfactorily without size into industrial woven fabrics, particularly air bag fabrics.

SUMMARY OF THE INVENTION

The objective thus arose to provide suitable yarns for making uncoated air bag fabrics, the yarns enabling cost-effective processing into woven fabrics without adversely affecting the required properties of the woven fabric and furthermore representing an improvement in the resulting woven fabrics compared to the air bag fabrics used predominantly up to now, especially with respect to foldability and flexibility.

Surprisingly, it has been found that this objective can be met in a particularly advantageous way if intermingled filament yarns in accordance with the present invention are employed. This enables manufacture, cost-effectively and without problems for the weaving process, of soft air bag fabrics with good foldability and without posing problems for specific adjustment of the desired air permeability.

DETAILED DESCRIPTION OF PREFERRED EMBODIMENTS

Air bags normally consist of a contact portion and a filter portion, which in most cases can be attained by sewing together fabrics with differing air permeability characteristics. In addition, one-piece woven air bags also exist with fabric sections having different air permeability values as do air bags made from one fabric section with air escape openings on the rear of the air bag.

The contact portion of the air bag is the portion against which gas produced by a generator flows when the air bag function is triggered. This portion is adjacent to the vehicle occupant. In this case, a low air permeability of normally <20 l/dm2.min, preferably <10 l/dm$^2$.min (measured at 500 Pa test differential pressure) is required.

To allow soft cushioning of the vehicle occupant in case of an accident, the gas flowing into the air bag must be able to partially escape. This is achieved by the filter portion at the rear, or the side portions in the case of the passenger-side air bag. For the filter portion, air permeability values between 20 and 100 l/dm$^2$.min, depending on the type of vehicle and measured at 500 Pa test differential pressure, are required. This portion of the air bag has the additional task of restraining hot particles in the generator gas, i.e., filtering them out before the gas enters the passenger compartment.

Polyamide (nylon) yarns are preferred for air bags, whereby nylon-6,6, nylon-4,6, and nylon-6 are especially preferred. However, other fiber types such as polyester fibers are occasionally used for making air bag fabrics. The invention, however, is not limited to a specific type of fiber but rather comprises all synthetic filament yarns, of which yarns made from polyamide and polyester fibers are preferred, and yarns from nylon-6,6, nylon-4,6 and nylon-6 fibers are especially preferred.

The yarns of the invention have yarn titers of 100–1000 dtex, preferably 200–500 dtex. The filament titer of these yarns is approx. 5 dtex or below, i.e. does not exceed 5 dtex. A filament titer of 2.4–5 dtex is preferred, and 3.4–5 dtex is especially preferred. The low filament titer is significant particularly for the foldability of the air bag fabric. Examples of yarn types that can be used are 235 f 72 with a filament titer of 3.26 dtex, 350 f 144 with a filament titer of 2.43 dtex, 470 f 144 with a filament titer of 3.26 dtex, 700 f 140 with a filament titer of 5.0 dtex, 700 f 144 with a filament titer of 4.86 dtex, 700 f 210 with a filament titer of 3.33 dtex, and 940 f 280 with a filament titer of 3.36 dtex. The yarn types cited here are to be considered as examples and are not limiting.

The polyamide yarns suited to making air bag fabrics have a strength of approx. 60 cN/tex, preferably greater than 60 cN/tex, and an elongation of 15–30%. When using polyester yarns for making air bag fabrics, the strength values are also approx. 60 cN/tex, preferably greater than 60 cN/tex, and the elongation is 10–25%.

For shrinkage values, differentiation is required between yarns for air bag contact fabrics and those for air bag filter fabrics. For polyamide yarns to be processed into filter fabrics, a hot-air shrinkage of 1–4% (measured at 190° C.) is required. Polyamide yarns to be processed into contact fabrics, on the other hand, must have a hot-air shrinkage of 5–9% (measured at 190° C.).

When using polyester yarns, the hot-air shrinkage is 1–4% (measured at 190° C.) for filter fabrics and 5–10% (measured at 190° C.) for contact fabrics.

The yarns of the invention are manufactured using conventional processes in the chemical fiber industry. For spinning of filament yarns from polyamides or polyesters, melt spinning processes are normally used. The setting of the desired titer is accomplished using known methods, in particular by controlling the throughput volume of the spinneret.

Intermingling is also an often-employed process in the chemical fiber industry. The mean opening length is controlled by precise coordination of the geometry of the intermingling jet, the tension and speed of entry into the intermingling jet, and the air volume applied. These process parameters for intermingling depend on the yarn titer and the lubricant applied to the yarn and must therefore be adapted accordingly. Based on practical operational experience, setting of the desired mean opening length is normally performed by pre-trials for orientation purposes.

It is important with the yarns of the invention to observe a mean opening length of 2–10 cm, preferably 2–6 cm. It is also possible to attain good processing results with yarns in the 6–9 cm range for mean opening length. Higher mean opening lengths do not provide satisfactory processing properties on the loom, since they do not permit sufficient yarn compactness and thus do not enable satisfactory incorporation of the break-prone individual fine filaments into the filament bundle. For example, a broken filament in a warp yarn will be pushed up only to the next intermingling point and on the loom pass the heddle with the intermingling point. If the next intermingling point is distant, a relatively long length of the broken filament is then pushed up, leading in the end to a slub that can no longer pass the heddle, possibly resulting in a yarn break. At the same time, there is also the possibility that the broken filament is taken up by the adjacent yarn in the warp and triggers the cited flaw in this yarn as well as in the yarn to which the filament belongs, i.e., breaks of adjacent yarns due to an obstruction of passage through the heddle. These "sympathetic" breaks can lead to flaws in the fabric known as "skips" to those skilled in the weaving art.

In a similar manner, excessive mean opening lengths can also have adverse effects on weft yarns. Single filaments projecting from the filament bundle, commonly referred to in weaving practice as "missing filaments", are, for example when processing on a rapier loom, not taken up by the gripper and lead to fluffs or in turn to slubs.

Mean opening lengths below the claimed range cannot be realized in practice without causing problems. Also, for values below the lower limit of the claimed range, decreased yarn strength and/or elongation can result. Furthermore, these low mean opening lengths result in a so-called granular-surfaced fabric, possibly producing an undesirable increase in the air permeability of the fabric.

Mean opening length is understood to be the average separation of the intermingling points in a yarn. An intermingling point, commonly also referred to as an intermingling node, is understood to be a point in the yarn at whose start a signal is emitted when measuring the length. These intermingling points, pre-formed by filament interlacing in the yarn, trigger a signal when the measurement needle is subjected to a certain resistance corresponding to a certain degree of intermingling.

Various processes are known in the chemical fiber and textile industries for measuring the opening length, the results of which are not always comparable. The data cited here was obtained exclusively with the Rothschild type R-2040 automatic yarn-entanglement tester.

In measuring with this device, the yarn undergoing testing is pretensioned over two hysteresis brakes such that the thread tension at the start of the actual measurement zone is 1.8 cN/tex. After a lead-in, the yarn is grasped by two thread guides and spread apart, whereupon a measurement needle penetrates the thread. After an adjustable peak tension has been attained, the so-called trip level, a measurement signal is triggered, an electronic metering relay is used to determine the yarn length passing through in the interim, and the length is recorded in a storage unit. Thereafter, the yarn is automatically drawn further and the measurement cycle repeated. In the interest of obtaining values that are easily reproducible, is it practical in determining the opening length to carry out 200 individual measurements and to average them.

An additional very important parameter for problem-free processing of intermingled fine-filament yarns into air bag fabrics is the stability of the intermingling points, sometimes referred to as intermingling node strength. This is understood to mean the resistance of the intermingling points to the tensile load unavoidably present on the loom. A low intermingling point stability leads to disbanding of the preformed filament interlacing in the filament yarn during the intermingling process when the yarn is subjected to tensile load, resulting in partial or complete loss of the yarn compactness the intermingling is intended to produce and the good incorporation of the individual filaments into the filament bundle.

Intermingling point stability is measured using the same procedure as for the intermingling length. The Rothschild type R-2040 automatic yarn-entanglement tester is also employed in this case.

For measuring the stability of the intermingling points, trip levels of 20 cN, corresponding to the normal opening length measurement, as well as 80 cN are used. Two measurements of the opening length result, whereby in the normal case the value at a trip level of 80 cN is higher than that at 20 cN. The formula $$K1 = \frac{\text{mean opening length at 20 } cN \text{ trip level}}{\text{mean opening length at 80 } cN \text{ trip level}}$$

provides the coefficient K1 for the stability of the intermingling points.

Essential for processing qualities, however, is the stability of the intermingling points during or after tensioning, unavoidable on the loom, particularly with warp yarns. For this reason, it is necessary to take this tension into account when assessing the desired processing qualities of the filament yarn.

To this end, two opening length measurements are conducted in accordance with the previously discussed measurement procedure. First, an initial measurement is conducted at a trip level of 80 cN. Then the yarn is rewound at a defined tension of 0.32 cN/tex. After rewinding, a second opening length measurement is conducted at a trip level of 80 cN. Based on the initial measurement obtained at a trip level of 80 cN and the measurement after rewinding, also at a trip level of 80 cN, the following formula is used to calculate the coefficient K2 for the stability of the intermingling points:

$$K2 = \frac{\text{mean opening length, initial measurement at 80 } cN}{\text{mean opening length at 80 } cN \text{ trip lvl. after rewinding}}$$

By evaluating both coefficients together, a practical judgment can be made concerning the suitability of the intermingled yarns for making air bag fabrics. Trials have shown that fine-titered yarns with a coefficient K1 exceeding 0.6, preferably between 0.6 and 0.9, and a coefficient K2 of 0.3, preferably between 0.3 and 0.9, at a mean opening length of 2–10 cm, not only enable problem-free fabric production on the loom but also yield fabrics that fully meet the requirements for air bag fabrics.

As previously discussed, there is a risk of decreased strength or elongation when the mean opening length is less than 2 cm. These parameters can decrease at the same time. This reduction of the yarn strength and/or yarn elongation can, as trials have shown and as the embodiment examples indicate, also occur in the claimed opening-length range of 2–10 cm. However, with a view toward functionality, particularly that of air bags, both the yarn strength and elongation must be within the previously cited ranges, and special attention must be therefore be paid to this aspect in the production of the yarns of the invention.

When evaluating yarns for use in making air bag fabrics or other industrial fabrics, it appears practical to include an additional coefficient K3. This is obtained from the coefficient K2 for the stability of the intermingling points, the yarn strength, and the yarn elongation according to the following equation:

$$K3 = K2 \cdot Rh \cdot e$$

where

K2=stability coefficient of the intermingling points after rewinding under tension, determined and calculated according to the previously cited procedure Rh=strength of the yarn in cN/tex e=elongation of the yarn in %

As will be shown in the embodiment examples, all three of the cited coefficients can be influenced by the geometry of the intermingling jet, independent of the mean opening length.

The coefficient K3 should not be less than 400, and a value greater than 600 is preferred.

The yarns of the invention can be processed into fabrics using various weaves. A plain weave is preferred, but other weaves such as hopsack, twill, rep, etc., can also be used.

In order to attain the same strength in the warp and weft directions, the fabric is preferably made with a symmetrical weave setting, i.e., with the same or nearly the same thread counts in warp and weft. The thread counts to be used depend on the selected yarn titer and the desired fabric density. Some examples of thread counts for contact fabrics, which should however not be considered as limiting, are:

| Yarn titer | Threads/cm |
| --- | --- |
| 235 dtex | 26-32 |
| 350 dtex | 22-28 |
| 470 dtex | 18-23 |
| 700 dtex | 14-18 |
| 940 dtex | 11.5-15.5 |

In making filter fabrics for air bags, low thread counts are normally employed. The thread counts must be adapted to the desired air permeability of the filter fabrics. Another possibility for making filter fabrics is variation of the weave.

Compared with yarns with filaments of higher titer (greater than 5 dtex, for example), the thread counts are about 1/cm lower when using the yarns of the invention, at the same yarn titer. With this decreased use of material, the yarns of the invention can be used for cost-effective production of fabrics of the desired density and/or air permeability.

The advantage of the yarns of the invention becomes even more evident at a low yarn titer of 235 dtex, for example. In this case, it is even possible to work with 2 threads per cm less than for yarns of the same yarn titer but higher filament titer (exceeding 5 cm, for example). The material savings and cost advantage in this case are more significant than in the case of yarns with a yarn titer of 470 dtex, for example.

The numbers offered here as examples apply to plain weaves.

The fabrics made from polyamide yarns can be subjected to a wet treatment to adjust the desired air permeability. This results in a shrinkage initiation and a considerable closure of the fabric interstices, resulting in the desired air permeability. A suitable process is described in EP-A 436 950. During subsequent drying, special process steps must be observed in the interest of good aging resistance, as is explained in detail in EP-A 523 546.

Fabrics made from polyester fibers need not undergo wet treatment. They can be subjected to a thermofixation treatment directly after fabric manufacture. A suitable process is described in EP-A 523 546.

For making air bags, it is also possible to use fabrics produced at a high fabric density in the so-called loom state. Since the yarns used usually contain a lubricant applied during production, however, a washing treatment is recommended to remove this lubricant, since over long periods of storage, for example in the steering wheel of a motor vehicle, the lubricant can serve as a breeding ground for microorganisms.

Using the yarns of the invention, industrial fabrics, particularly air bag fabrics, can be manufactured in a particularly advantageous manner. In addition to the opportunity to manufacture under cost-effective conditions, a further advantage of the yarns of the invention is that they yield fabrics that fulfill all requirements imposed on air bags, for example, in a particularly advantageous manner.

EXAMPLE 1

A nylon-6,6 filament yarn with a yarn titer of 470 dtex and a filament count of 144, giving a filament titer of 3.3 dtex, was subjected to intermingling trials with different intermingling jets. The initial yarn had a strength of 66.9 cN/tex and an elongation of 20.1%.

The four different intermingling jets, referred to in the following as jets a through d, had the following dimensions:

a. The jet had a thread channel diameter of 3.5 mm and a length of 35 mm. The diameter of the blowing channel was 2.0 mm, and the width of the insertion slit was 0.2 mm.

b. The dimensions correspond to those of jet a, the jet differing only in an additional thread guide before and after the jet.

c. The jet had a thread channel diameter of 3.5 mm and a length of 36 mm. The diameter of the blowing channel was 2.3 mm, and the width of the insertion slit was 0.35 mm.

d. The jet had a thread channel in form of an equilateral triangle with a cross-sectional area varying over the length of the channel. The diameter of the blowing channel was 1.7 mm and the length of the thread channel was 32 mm. The insertion slit had a width of 0.2 mm.

The results of the intermingling trials using these jets are summarized in the following table:

| Trial no. | 1a | 1b | 1c | 1d |
| --- | --- | --- | --- | --- |
| Strength cN/tex | 66.5 | 66.6 | 65.4 | 66.8 |
| Elongation % | 19.9 | 19.5 | 18.3 | 19.2 |
| Mean opening length cm | 4.6 | 2.9 | 3.3 | 5.2 |
| K1 | 0.85 | 0.86 | 0.76 | 0.72 |
| K2 | 0.77 | 0.93 | 0.60 | 0.39 |
| K3 | 1019 | 1208 | 718 | 500 |

EXAMPLE 2

Trial 1 was repeated using a nylon-6,6 filament yarn with a yarn titer of 350 dtex and a filament count of 144, giving a filament titer of 2.4 dtex. Intermingling was again performed in jets a through d as described in Example 1. The initial yarn had a strength of 66.5 cN/tex and an elongation of 20.3%.

The results of these trials are summarized in the following table:

| Trial no. | 2a | 2b | 2c | 2d |
| --- | --- | --- | --- | --- |
| Strength cN/tex | 64.5 | 66.2 | 64.2 | 66.9 |
| Elongation % | 18.1 | 18.5 | 18.1 | 20.2 |
| Mean opening length cm | 6.7 | 6.6 | 7.7 | 6.2 |
| K1 | 0.73 | 0.75 | 0.72 | 0.69 |
| K2 | 0.77 | 0.81 | 0.48 | 0.37 |
| K3 | 899 | 992 | 558 | 500 |

EXAMPLE 3

Trial 1 was repeated using a nylon-6,6 filament yarn with a yarn titer of 700 dtex and a filament count of 140, giving a filament titer of 5.0 dtex. Intermingling was again performed in Jets a through d as described in Example 1. The initial yarn had a strength of 68.2 cN/tex and an elongation of 19.8%.

The results of these trials are summarized in the following table:

| Trial no. | 3a | 3b | 3c | 3d |
| --- | --- | --- | --- | --- |
| Strength cN/tex | 68.4 | 68.8 | 66.3 | 66.7 |
| Elongation % | 19.0 | 20.1 | 18.7 | 19.2 |
| Mean opening length cm | 4.5 | 3.6 | 2.9 | 3.7 |
| K1 | 0.87 | 0.78 | 0.79 | 0.79 |
| K2 | 0.75 | 0.86 | 0.68 | 0.57 |
| K3 | 975 | 1182 | 843 | 730 |

EXAMPLE 4

A further repetition of trial 1 was conducted with a polyester yarn with the same titer (700 f 140) as that used for Example 3. The filament titer was therefore again 5.0 dtex. Intermingling was again performed in jets a through d as described in Example 1. The initial yarn had a strength of 69.7 cN/tex and an elongation of 17.8%.

The results of these trials are summarized in the following table:

| Trial no. | 4a | 4b | 4c | 4d |
| --- | --- | --- | --- | --- |
| strength cN/tex | 69.0 | 69.2 | 68.0 | 67.7 |
| Elongation | 17.0 | 18.1 | 17.7 | 17.0 |
| Mean opening length cm | 4.6 | 4.2 | 2.7 | 5.5 |
| K1 | 0.83 | 0.82 | 0.78 | 0.84 |
| K2 | 0.84 | 0.85 | 0.78 | 0.65 |
| K3 | 985 | 1064 | 938 | 748 |

As the trials indicate, the choice of intermingling jet plays a decisive role in producing the yarn of the invention. The jet geometry has a considerable influence on the stability coefficients of the intermingling points, which is not as evident in the K1 value but decidedly more pronounced in the K2 value. The targeted K2 of more than 0.3 was attained with all jets, but it was not exceeded as clearly with jets c and d as with jets a and b.

The difference between the jets is more pronounced if evaluation is performed based on the K3 value, i.e., when a possible reduction in strength and elongation after intermingling is to be considered in the evaluation. The targeted value of 400 was exceeded in each case, but the preferred range exceeding 600 was not attained in all cases. This as well shows that jets a and b exhibit more favorable data than jets c and d. Even comparing the jets in one pair with each other, a difference can be noted. Jet b exhibits better data than jet a, and jet c better data than jet d.

While the invention has been described with preferred embodiments, it is to be understood that variations and modifications are to be considered within the purview and scope of the claims appended hereto.

What is claimed is:

1. An intermingled unsized synthetic filament yarn, particularly synthetic filament yarn for making woven fabrics for air bags and other industrial applications, with a yarn titer of from 100 to 1000 dtex, wherein the individual filaments of the yarn have a titer not exceeding 5 dtex, that the yarn exhibits a mean opening length of from 2 to 10 cm, and that the coefficient K1 for the stability of the intermingling points of the yarn exceeds 0.6 and the coefficient K2 for the stability of the intermingling points of the yarn exceeds 0.3.

2. The synthetic filament yarn in accordance with claim 1, wherein the coefficient K3 derived from the yarn strength, yarn elongation, and stability coefficient K2 exceeds 400.

3. The synthetic filament yarn in accordance with claim 1, wherein the yarn comprises polyamide or polyester filaments.

4. The synthetic filament yarn in accordance with claim 3, wherein the yarn comprises nylon-6,6, nylon-4,6, or nylon-6 filaments.

5. An industrial woven fabric comprising an intermingled synthetic filament yarn with a yarn titer of from 100 to 1000 dtex, wherein the titer of the individual filaments of this yarn does not exceed 5 dtex and that the yarn prior to weaving has a mean opening length of from 2 to 10 cm, a coefficient K1 for the stability of the intermingling points of the yarn exceeding 0.6, and a coefficient K2 for the stability of the intermingling points of the yarn exceeding 0.3.

6. A woven fabric for air bags, comprising an intermingled synthetic filament yarn with a yarn titer of from 100 to 1000 dtex, wherein the titer of the individual filaments of this yarn does not exceed 5 dtex and that the yarn prior to weaving has a mean opening length of from 2 to 10 cm, a coefficient K1 for the stability of the intermingling points of the yarn exceeding 0.6, and a coefficient K2 for the stability of the intermingling points of the yarn exceeding 0.3.

* * * * *